(12) United States Patent
Kim et al.

(10) Patent No.: US 7,698,932 B2
(45) Date of Patent: Apr. 20, 2010

(54) DEVICE FOR MEASURING UNEVEN WEAR OF STARTER BRUSHES FOR VEHICLE

(75) Inventors: Min-Ho Kim, Gyeonggi-Do (KR); Bum Soo Kim, Gyeonggi-Do (KR); Yu Jin Bae, Seoul (KR)

(73) Assignee: Hyundai Motor Company, Seoul (KR)

( * ) Notice: Subject to any disclaimer, the term of this patent is extended or adjusted under 35 U.S.C. 154(b) by 336 days.

(21) Appl. No.: 11/980,121

(22) Filed: Oct. 30, 2007

(65) Prior Publication Data

US 2008/0307871 A1    Dec. 18, 2008

(51) Int. Cl.
G01M 13/00 (2006.01)
G01M 19/00 (2006.01)
G01R 31/34 (2006.01)

(52) U.S. Cl. .................. 73/114.59; 310/242; 324/754; 324/772

(58) Field of Classification Search ......... 310/238–239, 310/242, 245, 248–249; 73/114.58, 114.59
See application file for complete search history.

(56) References Cited

U.S. PATENT DOCUMENTS 3,479,640 A * 11/1969 Puma .......................... 340/454
4,687,990 A * 8/1987 Finch .......................... 324/772
5,301,545 A * 4/1994 Meyer et al. .................. 73/105

* cited by examiner

*Primary Examiner*—Burton Mullins
(74) *Attorney, Agent, or Firm*—Edwards Angell Palmer & Dodge LLP

(57) ABSTRACT

The present invention provides a device for measuring uneven wear of starter brushes for a vehicle which can accurately measure and compare the lengths of the starter brushes and easily determine whether or not eccentricity of an armature occurs, the device comprising: a hollow support; a receiving plate formed integrally with the outer circumferential surface of an upper portion of the hollow support to accommodate a plurality of brushes; a lifting body liftably inserted into the inside of the hollow support; a plurality of detection rods slidably connected to the outer circumferential surface of an upper portion of the lifting body and moving forward or backward toward the brushes; a lift driving means for driving the lifting body; a plurality of measuring sensors for measuring the lengths of the brushes by means of the detection rods; and an LCD panel for displaying the measured lengths; and a control unit for controlling the lift driving means, the measuring sensors and the LCD panel.

7 Claims, 6 Drawing Sheets

DEVICE FOR MEASURING UNEVEN WEAR OF STARTER BRUSHES FOR VEHICLE

CROSS-REFERENCE TO RELATED APPLICATION

This application claims under 35 U.S.C. §119(a) on Korean Patent Application No. 10-2007-0057549, filed on Jun. 13, 2007, the entire contents of which are incorporated herein by reference.

BACKGROUND (a) Technical Field

The present invention relates to a device for measuring uneven wear of starter brushes for a vehicle and, more particularly, to a device for measuring uneven wear of starter brushes for a vehicle which can accurately measure and compare the lengths of the starter brushes and easily determine whether or not eccentricity of an armature occurs.

(b) Background Art

A starter motor is one of the component parts of a vehicle, which converts electrical energy of a battery into mechanical energy to start an engine.

The starter motor basically comprises an armature, a yoke, a permanent magnet, a brush, a bearing, and a shaft. The shaft connected to an engine by means of a worm gear plays a role in transferring power to the engine.

In general, the starter motor is operated to start the engine and requires a high torque. It thus has a tendency to more easily get out of order than the other motors of the vehicle.

If the starter motor gets out of order, it should be replaced with a new one. However, since the starter motor has a structure similar to an ordinary motor and the main trouble occurs in limited areas, it is easy to recycle the starter motor. Accordingly, recycled goods are frequently used instead of new ones.

The main trouble areas are an armature commutator and a brush portion. When the two portions are in direct contact with each other and rotated, abrasive wear occurs.

Especially, if eccentricity is present in the armature, uneven wear, in which only one or two of four brushes are serious worn, occurs. As a result, vehicle vibration is generated and power transmission efficiency is reduced.

At present, recycling manufacturers determine whether or not to recycle the worn brushes by visual inspection and dispose of them if not recyclable.

However, since the visual inspection is conducted in a way that an examiner measures the lengths of the brushes by his naked eyes, it is difficult to accurately inspect the brushes and the variation is quite large according to the workers.

As a result, brushes that should be disposed of may be reused, which causes quality problems in the recycled starter motors. Alternatively, brushes that should be reused may be disposed of.

Accordingly, some of these recycling manufacturers do not reuse the brushes but replace all brushes with new ones. The reason for this is that it is difficult to ensure the quality of the reused brushes due to the large variation according to the workers and the unit price of the brush is not high.

When the worn brushes are all replaced with new ones, no inspection is made separately and thus causes a substantial problem.

For example, if four brushes are worn uniformly as shown in FIG. 5, it is determined that there is no eccentricity in the armature and hence there is no problem. Whereas, if uneven wear occurs between the four brushes as shown in FIG. 6, it will cause a problem since the uneven wear means that eccentricity is present in the armature.

Here again, there is a cause (eccentricity of armature) and effect (uneven wear of brushes) relationship between the armature and the brushes.

Accordingly, if the unevenly worn brush is replaced with a new one, there is no serious problem in the brush in itself; however, it causes various problems such as vibration generated in the field due to the eccentricity of the armature.

Meanwhile, there is a method of measuring the eccentricity of the armature. However, expensive and very precise equipment is required to measure the delicate eccentricity and a lot of time and cost are required to set the positions of the armature, yoke, and permanent magnet one by one. Accordingly, the conventional method of measuring the eccentricity of the armature is not applicable to the existing recycling manufacturers.

Another method is to measure uneven wear of starter brushes. However, since the method is applied only to the brushes without setting the armature, yoke, and the like, it requires less time and cost. Moreover, since the method measures only the lengths of brushes, the measurement equipment is relatively inexpensive. Furthermore, although the method indirectly measures the eccentricity of the armature, it is believed that it is better than the method of measuring the eccentricity of the armature in terms of efficiency.

The information disclosed in this Background section is only for enhancement of understanding of the background of the invention and should not be taken as an acknowledgement or any form of suggestion that this information forms the prior art that is already known to a person skilled in the art.

SUMMARY OF THE INVENTION

The present invention has been made in an effort to provide a device for measuring uneven wear of starter brushes for a vehicle, in which detection rods are moved forward by the same length toward four starter brushes to measure the lengths of the starter brushes such that uneven wear degrees of the respective brushes are displayed through an LCD panel to be compared with one another and it is possible to easily determine whether or not eccentricity of an armature occurs.

In one aspect, the present invention provides a device for measuring uneven wear of starter brushes for a vehicle, comprising: a hollow support; a receiving plate formed integrally with the outer circumferential surface of an upper portion of the hollow support to accommodate a plurality of brushes; a lifting body liftably inserted into the inside of the hollow support; a plurality of detection rods slidably connected to the outer circumferential surface of an upper portion of the lifting body and moving forward or backward toward the brushes; a lift driving means for driving the lifting body; a plurality of measuring sensors for measuring the lengths of the brushes by means of the detection rods; and an LCD panel for displaying the measured lengths; and a control unit for controlling the lift driving means, the measuring sensors and the LCD panel.

In a preferred embodiment, the lift driving means, the measuring sensors, the LCD panel, and the control unit are mounted in a housing in a predetermined arrangement.

In another preferred embodiment, an upper portion of the lifting body is formed to be inclined downward, and a plurality of sliding grooves, to which the rear ends of the detection rods are slidably connected, is formed on the inclined portion downward.

In still another preferred embodiment, the lift driving means comprises a spur gear engaged with a rack formed on a lower end portion of the lifting body, and a motor including the spur gear as a shaft and mounted inside the housing.

In a further preferred embodiment, a plurality of guide pipes for guiding forward and backward movements of the detection rods are integrally formed on the outer circumferential surface of an upper end portion of the hollow support protruding upwardly from the receiving plate.

In yet a further preferred embodiment, a contact member is connected to a front end portion of the detection rod by means of a spring.

In yet a still further preferred embodiment, the plurality of measuring sensors can be integrated into one sensor.

Figure 1:
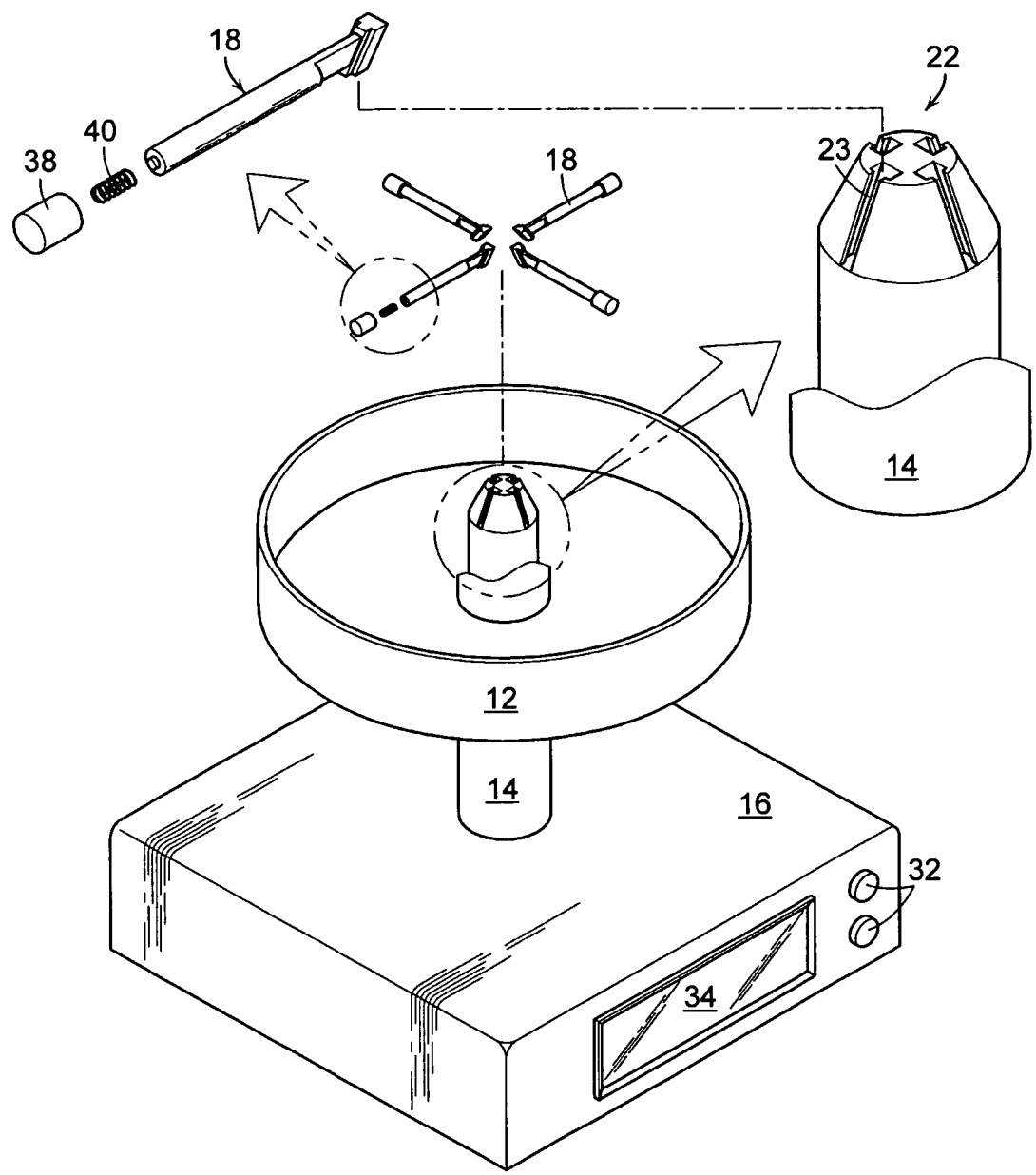
FIG. 1 is an exploded perspective view illustrating a device for measuring uneven wear of starter brushes in accordance with a preferred embodiment of the present invention.

Reference numerals set forth in the Drawings includes reference to the following elements as further discussed below:

| | |
|---|---|
| 10: brush | |
| 14: hollow support | |
| 18: detection rod | |
| 22: lifting body | |
| 24: motor | |
| 28: rack | |
| 32: operation switch | |
| 36: control unit | |
| 40: spring | |
| 12: receiving plate | |
| 16: housing | |
| 20: guide pipe | |
| 23: sliding groove | |
| 26: spur gear | |
| 30: measuring sensor | |
| 34: LCD panel | |
| 38: contact member | |

DETAILED DESCRIPTION

Reference will now be made in detail to the preferred embodiment of the present invention, examples of which are illustrated in the drawings attached hereinafter, wherein like reference numerals refer to like elements throughout. The embodiments are described below so as to explain the present invention by referring to the figures.

Figure 2:
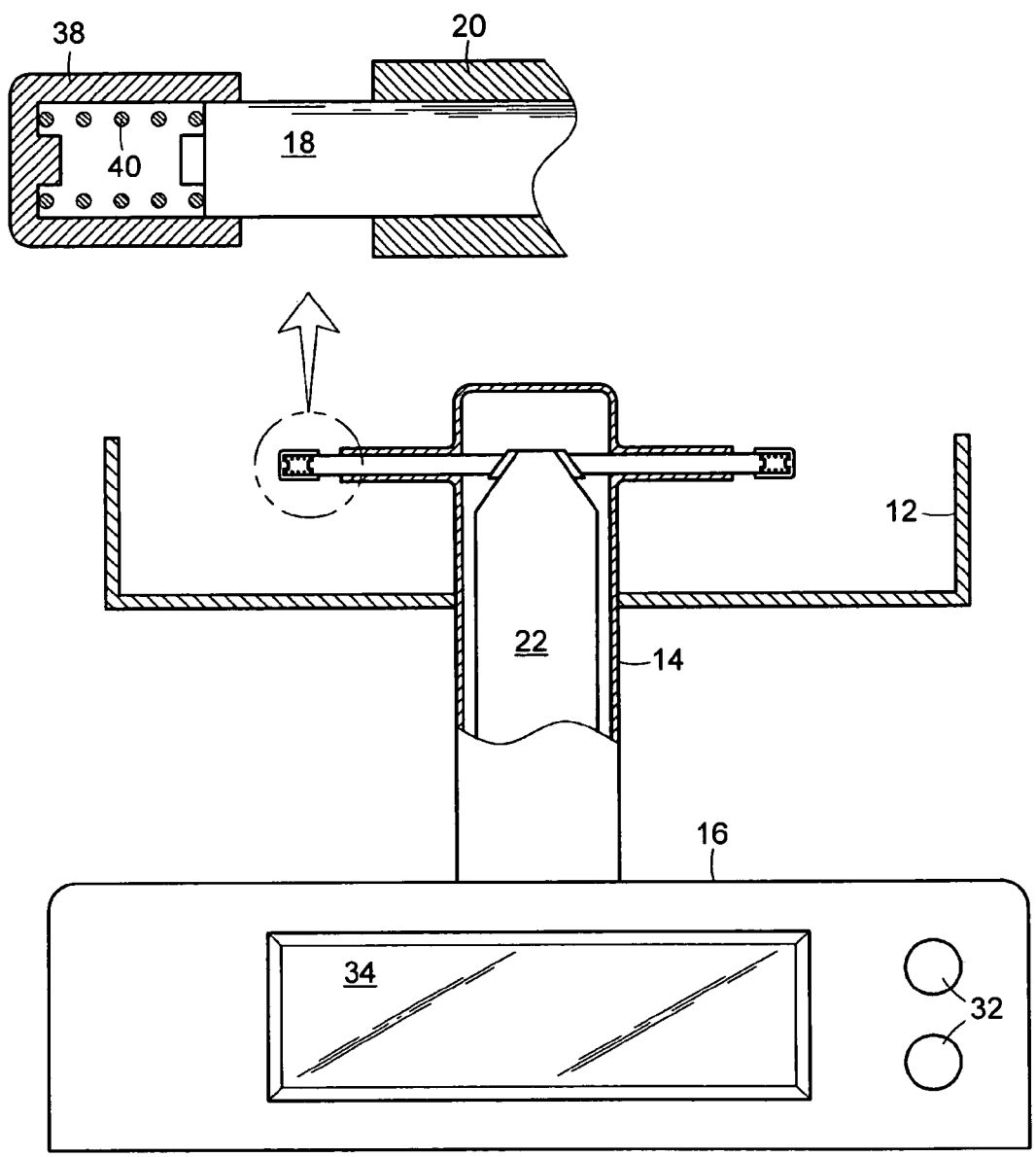
FIG. 2 is a cross-sectional view illustrating the device for measuring uneven wear of starter brushes in accordance with the preferred embodiment of the present invention.
Figure 3:
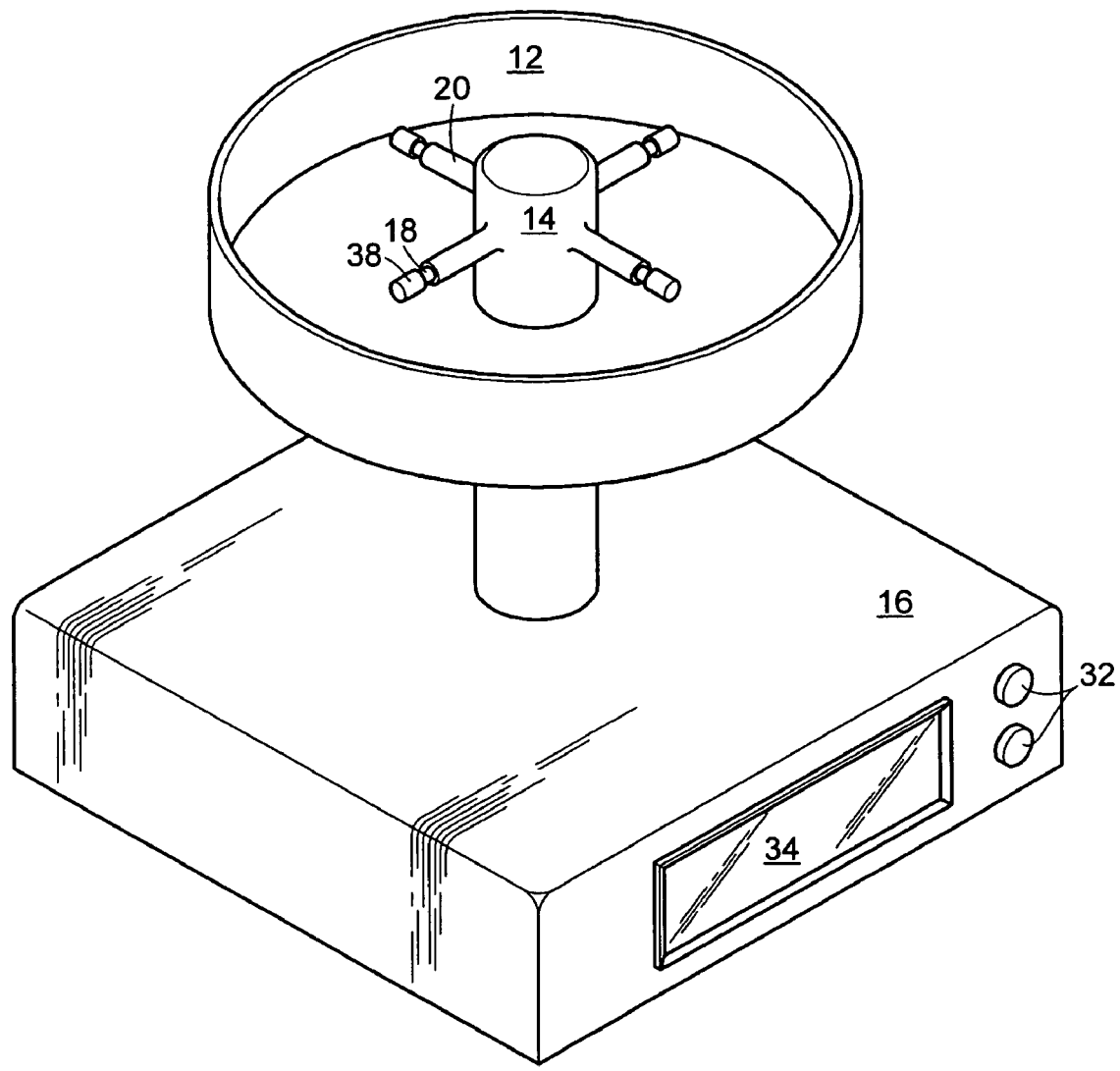
FIG. 3 is a perspective view illustrating the device for measuring uneven wear of starter brushes in accordance with the preferred embodiment of the present invention.

FIG. 1 is an exploded perspective view illustrating a device for measuring uneven wear of starter brushes in accordance with a preferred embodiment of the present invention, FIG. 2 is a cross-sectional view showing an assembled state thereof, and FIG. 3 is a perspective view showing the assembled state thereof.

The present invention provides a measuring device which can determine whether or not eccentricity is present in an armature by accurately measuring and comparing the lengths of four starter brushes for a vehicle.

As aforementioned, since the brush itself is replaceable with a new one, the length of the brush is not important, but the length deviation of four brushes is important.

That is, if the four brushes are uniformly worn, it is determined that there is no eccentricity in the armature and it is possible to recycle the starter motor by replacing the brushes with new ones. By contrast, if the length deviation of the four brushes is quite large, it is necessary to measure an accurate eccentricity by synthetically checking the armature, yoke, and permanent magnet.

The configuration of the present invention will be described in more detail with reference to the accompanying drawings.

The measuring device of the present invention broadly includes a receiving plate 12, in which brushes 10 are placed, a hollow support 14, and a housing 16.

The receiving plate 12 is a disc-shaped vessel and formed integrally with the outer circumferential surface of an upper portion of the hollow support 14.

The upper portion of the hollow support 14 penetrates the central portion of the receiving plate 12 and protrudes upward to a height slightly greater than that of the receiving plate 12.

The housing 16 is, for example, a rectangular box, of which the top surface is integrally connected to the bottom of the hollow support 14.

Like this, the receiving plate 12 and the housing 16 are connected with each other by the hollow support 14.

Meanwhile, four guide pipes 20 for guiding forward and backward movements of detection rods 18 and maintaining the straight movements thereof are integrally formed at regular intervals on the upper end portion of the hollow support 14, i.e., on the outer circumferential surface of the upwardly protruding portion of the hollow support 14.

A lifting body 22 having a cylindrical rod shape is liftably inserted into the inside of the hollow support 14. An upper portion of the lifting body 22 is formed to be inclined downward, and sliding grooves 23, through which the detection rods 18 inserted in the guide pipes 20 are slidably connected, are formed on the inclined portion.

Preferably, each of the sliding grooves 23 has a cross-sectional structure in which the entrance is narrower and the inside is wider. Each rear end of the detection rods 18 has a larger diameter to the extent that the detection rod 18 inserted into the inside of the sliding groove 23 is not separated therefrom.

Especially, a contact member 38 to be in contact with the brush 10 is connected to the front end portion of the detection rod 18 by means of a spring 40. The contact member 38 plays a role in adjusting the forward movement length of the detection rod 18 according to the wear amount of the brush 10.

In this case, a lift driving means for driving the lifting body 22 comprises a motor 24 fixedly mounted to the inside of the housing 16, a spur gear 26 connected to a shaft of the motor 24, and a rack formed on the lower end portion of the lifting body 22 to be engaged with the spur gear 26.

Moreover, four measuring sensors 30 connected to communicate with the detection rods 18 and measuring the lengths of the brushes 10 are provided in the inside of the housing 16.

Furthermore, an operation switch 32 and an LCD panel 34 are provided on the front surface of the housing 16 in a predetermined arrangement.

In addition, a control unit 36 receiving measured values of the measuring sensors 30 to display the received value on the LCD panel 34 and receiving an ON signal of the switch 32 to drive the motor 24 is provided on the inner wall of the housing 16.

Meanwhile, there may be provided four measuring sensors 30 in accordance with the four detection rods 18 or it is possible to integrate the measuring sensors 30 into one sensor. The measuring sensor 30 requires a high precision since the wear degree of the brush is measured in the unit of millimeter. Accordingly, it is preferable that the measuring sensor 30 can measure the wear degree in the unit of 0.1 millimeter.

Next, operation mode of measuring uneven wear of starter brushes using the measuring device of the present invention will be described in detail with reference to the accompanying drawings.

Figure 4:
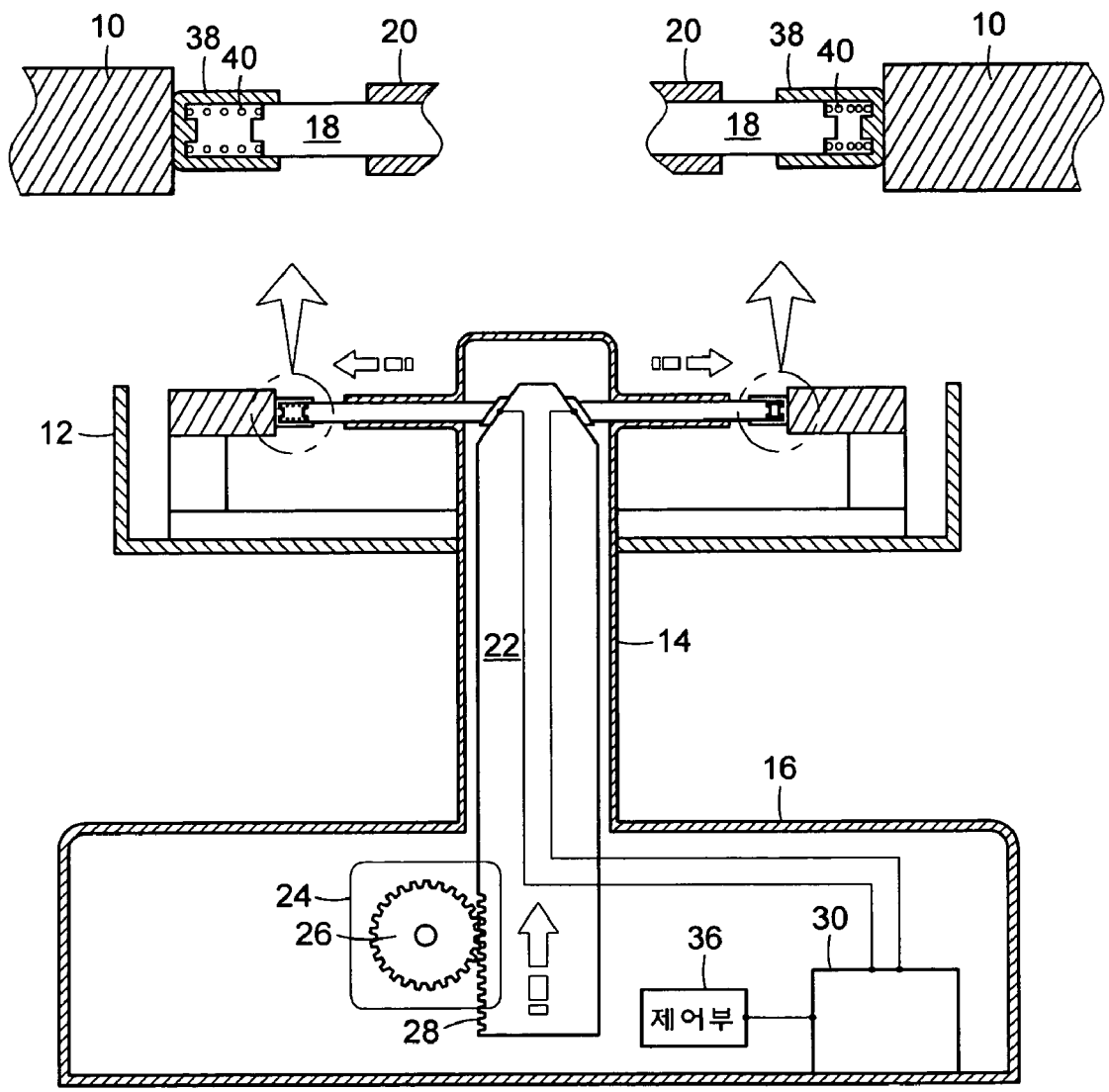
FIG. 4 is a cross-sectional view illustrating the operation state of the device for measuring uneven wear of starter brushes in accordance with the present invention.
Figure 5:
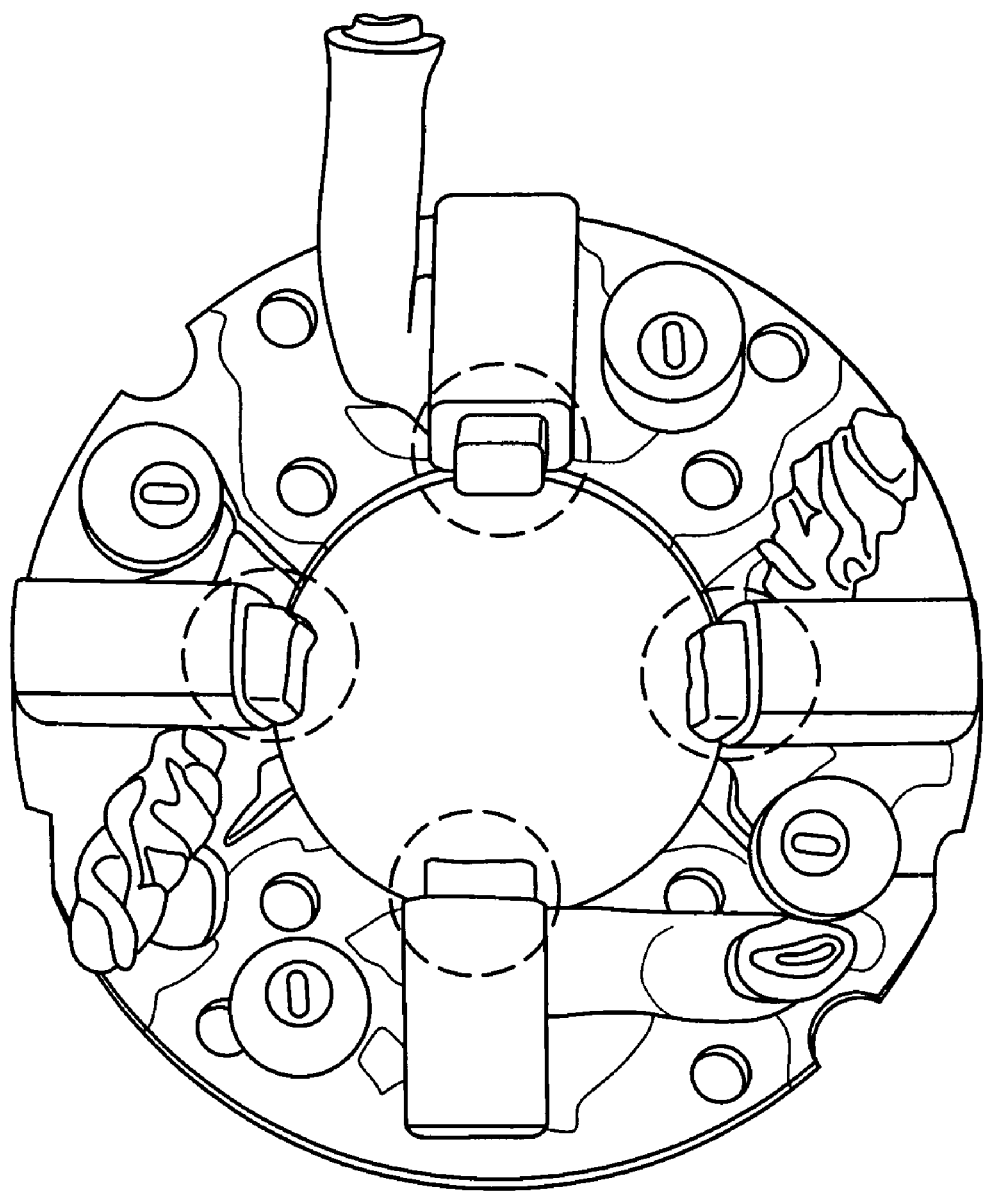
FIG. 5 is a photograph showing starter brushes where there is no uneven wear.
Figure 6:
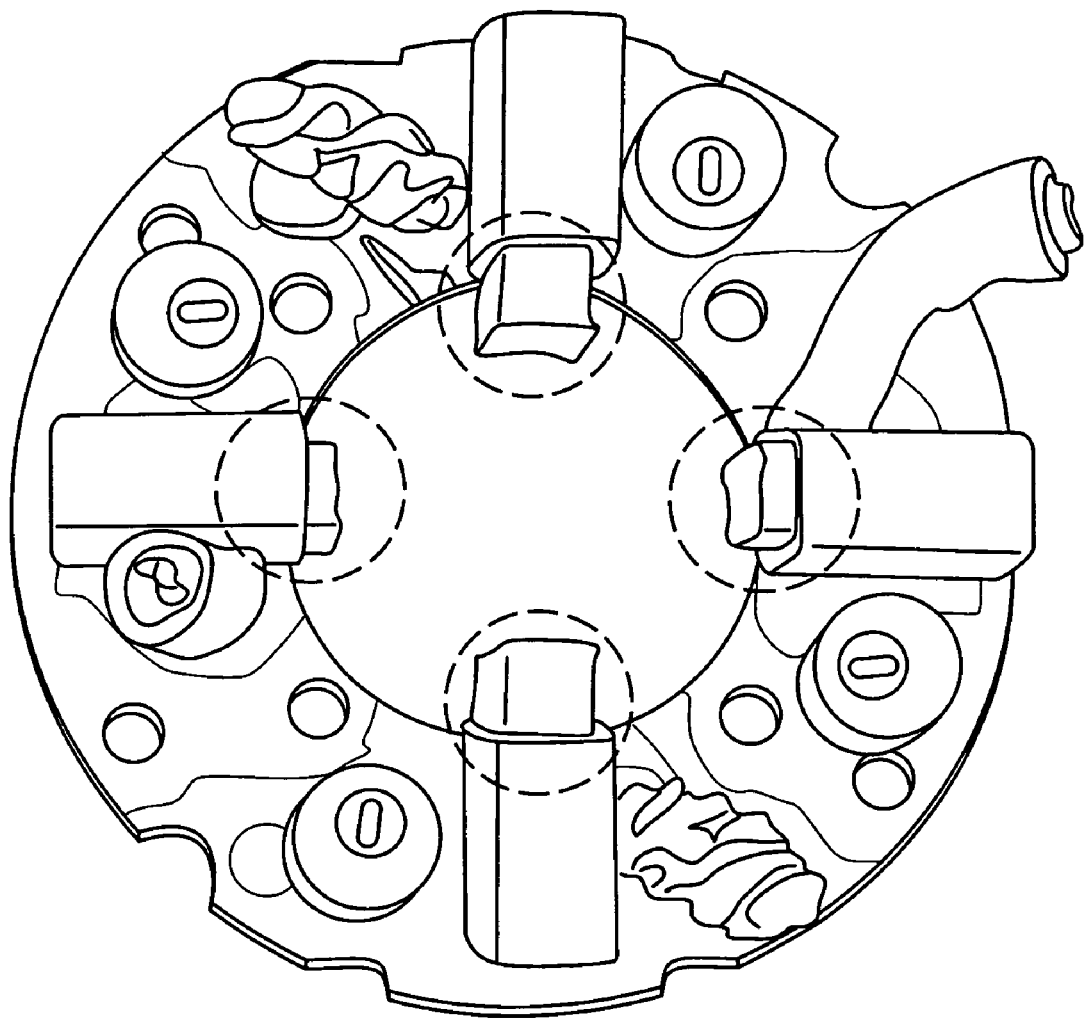
FIG. 6 is a photograph showing starter brushes where there is uneven wear.

FIG. 4 is a cross-sectional view illustrating the operation state of the device for measuring uneven wear of starter brushes in accordance with the present invention.

First, the brushes 10 of the starter motor are placed in the receiving plate 12 such that the respective brushes 10 are aligned with the detection rods 18 inserted in the guide pipes 20.

In this case, each rear end of the detection rods 18 is being positioned at the upper portion of the sliding groove 23 of the lifting body 22.

Subsequently, if the operation switch 32 provided on the front surface of the housing 16 is turned on, the motor 24 is driven according to a signal from the control unit 36.

The spur gear 26 is rotated along with the driving of the motor 24 and thereby the rotational force of the spur gear 26 is transferred to the rack 28 engaged with the spur gear 26.

With the rotational force of the spur gear 26 transferred to the rack 28, the lifting body 22 is lifted up.

At the same time with the lifting-up of the lifting body 22, the detection rods 18 moves forward, i.e., toward the brushes 10 along the guide pipes 20.

That is, the detection rods 18 positioned at the upper portion of the sliding grooves 23 are moved downward along the lifting-up of the lifting body 22. Moreover, since sliding grooves 23 of the lifting body 22 are formed to be inclined downward, the detection grooves 23 are pushed toward the brushes 10 along the lifting-up of the lifting body 22, thus moving forward.

Subsequently, at the very moment when the detection rods 18 are in contact with the brushes 10, signals are transmitted to the respective measuring sensors 30 in the housing 16 such that the measuring sensors 30 measures the lengths of forward movement of the respective detection rods 18.

Actually, the contact members 38 attached to the springs 40 in the front end portion of the four detection rods 18 are in contact with the brushes 10.

Accordingly, at the same time with the lifting-up of the lifting body 22, the four detection rods 18 connected to the sliding grooves 23 of the lifting body 22, i.e., first to fourth detection rods 18 are moved forward along the guide pipes 20. For example, if the wear amount of one of the four brushes is 10 mm, and if the wear amount of the other brushes is 5 mm, the first detection rod 18 is moved forward by 10 mm toward the brush having 10 mm wear, and the second to fourth detection rods 18 are moved forward by 5 mm.

Here, since the first to fourth detection rods 18 are pushed by the lifting-up of the lifting body 22 and move forward, the contact members 38 of the second to fourth detection rods 18 are blocked by the brushes having 5 mm wear and thereby the second to fourth detection rods 18 cannot move forward any longer; however, actually, the first to fourth detection rods 18 can move forward by the forward movement length of the first detection rod 18 by compressing the springs 40 thereof. Here, the contact member 38 of the first detection rod 18 can be in contact with the brush having 10 mm wear, not compressing the spring 40 thereof.

At the very moment when the contact members 38 of the first to fourth detection rods 18 are in contact with the brushes 10, signals are transmitted to the respective measuring sensors 30 provided in the housing 16, and the measuring sensors 30 measures the lengths of the forward movement of the respective detection rods 18.

Subsequently, the measured signals of the measuring sensors 30 are transmitted to the control unit 36, and the control unit 36 displays the forward movement lengths of the respective detection rods 18 expressed numerically on the LCD panel 34.

If the forward movement lengths of the respective detection rods 18 are the same, it can be determined that the respective brushes 10 are worn uniformly. On the other hand, if the forward movement lengths of the respective detection rods 18 are different from one another, it can be determined that uneven wear occurs in the brushes 10.

Meanwhile, when the detection rods 18 being in contact with the brushes 10 transmit signals to the measuring sensors 30, the control unit 36 transmits a reverse driving signal to the motor 24 so that the lifting body 22 comes down and, at the same time, the detection rods 18 return to the inside of the guide pipes 20.

As such, it is possible to accurately measure the wear degrees of the four brushes included in the starter motor and easily determine whether or not eccentricity of the armature occurs.

As described above, according to the device for measuring uneven wear of starter brushes for a vehicle, it is possible to facilitate the measurement of uneven wear of starter brushes by readily measuring the uneven wear for the respective brushes using the detection rods and the measuring sensors and displaying the uneven wear degrees through the LCD panel.

Especially, since the uneven wear amounts of the respective brushes can be measured and compared with one another, it is possible to readily determine whether or not eccentricity of an armature occurs.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A device for measuring uneven wear of starter brushes for a vehicle, comprising:
   a hollow support;
   a receiving plate formed integrally with the outer circumferential surface of an upper portion of the hollow support to accommodate a plurality of brushes;
   a lifting body liftably inserted into the inside of the hollow support;
   a plurality of detection rods slidably connected to the outer circumferential surface of an upper portion of the lifting body and moving forward or backward toward the brushes;
   a lift driving means for driving the lifting body;
   a plurality of measuring sensors for measuring the lengths of the brushes by means of the detection rods; and
   an LCD panel for displaying the lengths measured by the measuring sensors; and a control unit for controlling the lift driving means, the measuring sensors and the LCD panel.

2. The device of claim 1, further comprising a housing in which the lift driving means, the measuring sensors, the LCD panel, and the control unit are mounted in a predetermined arrangement.

3. The device of claim 1, wherein an upper portion of the lifting body is formed to be inclined downward, and a plurality of sliding grooves to which the rear ends of the detection rods are slidably connected is formed on the downwardly inclined portion.

4. The device of claim 1, wherein the lift driving means comprises a spur gear engaged with a rack formed on a lower end portion of the lifting body, and a motor including the spur gear as a shaft and mounted inside the housing.

5. The device of claim 1, wherein a plurality of guide pipes for guiding forward and backward movements of the detection rods are integrally formed on the outer circumferential surface of an upper end portion of the hollow support protruding upwardly from the receiving plate.

6. The device of claim 1, wherein a contact member is connected to a front end portion of the detection rod by means of a spring.

7. The device of claim 1, wherein the plurality of measuring sensors is integrated into one sensor.

* * * * *